(12) United States Patent
Werstat et al.

(10) Patent No.: US 8,869,527 B2
(45) Date of Patent: Oct. 28, 2014

(54) METHOD FOR MOUNTING AND SETTING AN ACTUATOR OF AN EXHAUST GAS TURBOCHARGER, AND AN ACTUATOR INTENDED FOR A CHARGING DEVICE

(75) Inventors: Eike Werstat, Helmstedt (DE); Martijn de Graaff, Braunschweig (DE); Torsten Jäckel, Wendeburg (DE); Tim Lowak, Leimen (DE); Alexander Schäffner, Plankstadt (DE); Daniel Dobernig, Grafenstein (AT); Reinhold Gracner, Griffen (AT); Jaroslav Kierat, Frankenthal (DE)

(73) Assignees: Volkswagen AG, Wolfsburg (DE); IHI Charging Systems International GmbH, Heidelberg (DE); Mahle International GmbH, Stuttgart (DE)

( * ) Notice: Subject to any disclaimer, the term of this patent is extended or adjusted under 35 U.S.C. 154(b) by 111 days.

(21) Appl. No.: 13/410,413

(22) Filed: Mar. 2, 2012

(65) Prior Publication Data

US 2012/0216534 A1    Aug. 30, 2012

Related U.S. Application Data

(63) Continuation of application No. PCT/DE2010/001028, filed on Sep. 1, 2010.

(30) Foreign Application Priority Data

Sep. 3, 2009  (DE) .......................... 10 2009 039 911
Nov. 21, 2009  (DE) .......................... 10 2009 054 241

(51) Int. Cl.
F02D 23/00  (2006.01)
F16K 31/44  (2006.01)
F01D 17/10  (2006.01)
F02B 37/18  (2006.01)

(52) U.S. Cl.
CPC ............ *F02B 37/186* (2013.01); *F01D 17/105* (2013.01); *Y02T 10/144* (2013.01); *F05D 2220/40* (2013.01)
USPC ............................................. 60/602; 251/77

(58) Field of Classification Search
USPC ............................................... 60/602; 251/77
See application file for complete search history.

(56) References Cited

U.S. PATENT DOCUMENTS

| 2,787,294 A | * | 4/1957 | Carriol | ............................ 251/77 |
| 4,656,834 A | * | 4/1987 | Elpern | ............................ 60/602 |

(Continued)

FOREIGN PATENT DOCUMENTS

| CN | 102803679 A | 11/2012 |
| DE | 695 17 108 T2 | 9/2000 |

(Continued)

OTHER PUBLICATIONS

Machine translation of FR 2707712 A1 (published Jan. 20, 1995, as provided in applicant's IDS filed May 17, 2012) obtained from epo.org on Oct. 10, 2013 (see attached).*

(Continued)

*Primary Examiner* — Thai Ba Trieu
*Assistant Examiner* — Ngoc T Nguyen
(74) *Attorney, Agent, or Firm* — Manfred Beck, P.A.

(57) ABSTRACT

A method for mounting and setting an actuator of an exhaust gas turbocharger and a suitable electric actuating device are provided. The actuating device has an axially movable actuating rod which is connected to a coupling element which for its part is connected via a pivot pin to an actuation section of a bypass valve, the actuation section being configured as a lever arm. In order to set the desired closed position of the bypass valve during a predefined actuation of the actuating device, the coupling element is first connected to the actuating rod while still being displaceable. Before the fixing, the position of the actuating device which corresponds to the closed position is set by application of the corresponding voltage to the electric actuating device. Subsequently, a pre-stressing force is applied to the coupling element coaxially with respect to the actuating rod via a pneumatic actuator.

21 Claims, 12 Drawing Sheets

(56) References Cited

U.S. PATENT DOCUMENTS

| | | | | |
|---|---|---|---|---|
| 4,768,545 | A | * | 9/1988 | Hoffman .................. 251/231 |
| 5,159,815 | A | * | 11/1992 | Schlamadinger ............... 60/603 |
| 5,511,442 | A | | 4/1996 | Tame |
| 5,571,237 | A | | 11/1996 | Lu et al. |
| 6,205,784 | B1 | * | 3/2001 | Knaack et al. .................. 60/602 |
| 6,269,642 | B1 | * | 8/2001 | Arnold et al. .................. 60/602 |
| 6,658,846 | B1 | * | 12/2003 | McEwan ......................... 60/602 |
| 7,887,065 | B2 | * | 2/2011 | Trudeau et al. ............ 280/5.514 |
| 2005/0050888 | A1 | * | 3/2005 | McEwan ......................... 60/602 |
| 2007/0271917 | A1 | | 11/2007 | Vogt |
| 2008/0115622 | A1 | | 5/2008 | Uhl et al. |
| 2011/0000209 | A1 | | 1/2011 | Boening et al. |
| 2011/0099999 | A1 | * | 5/2011 | Natali .............................. 60/602 |
| 2011/0291036 | A1 | * | 12/2011 | Yamanaka et al. ............. 251/251 |
| 2012/0117966 | A1 | | 5/2012 | Boening et al. |
| 2013/0255250 | A1 | * | 10/2013 | Naunheim et al. .............. 60/602 |

FOREIGN PATENT DOCUMENTS

| | | | |
|---|---|---|---|
| DE | 202004016321 | U1 | 3/2005 |
| DE | 69922302 | T2 | 11/2005 |
| DE | 102005023260 | A1 | 11/2006 |
| DE | 102007009267 | A1 | 9/2007 |
| DE | 202008011150 | U1 | 12/2008 |
| DE | 102008011416 | A1 | 9/2009 |
| DE | 102008015855 | A1 | 10/2009 |
| DE | 10 2008 045 227 | A1 | 1/2010 |
| DE | 102008032928 | A1 | 1/2010 |
| DE | 10 2009 029 880 | A1 | 12/2010 |
| EP | 1714064 | B1 | 3/2008 |
| EP | 2 446 130 | A1 | 5/2012 |
| FR | 2707712 | A1 | 1/1995 |
| GB | 2344400 | A | 6/2000 |
| JP | 2011247399 | A * | 12/2011 .............. F16K 31/53 |
| JP | 2012132554 | A * | 7/2012 .............. F16K 31/44 |
| WO | 2010/149442 | A1 | 12/2010 |

OTHER PUBLICATIONS

International Search Report (Form PCT/ISA/210) for International Application No. PCT/DE2010/001028, dated Nov. 8, 2010.
Translation of Written Opinion of the International Searching Authority (Form PCT/ISA/237) for International Application No. PCT/DE2010/001028, dated Nov. 8, 2010.
Search Report issued by the German Patent Office for German Patent Application No. DE 10 2009 054 241.8, dated Sep. 9, 2010.

* cited by examiner

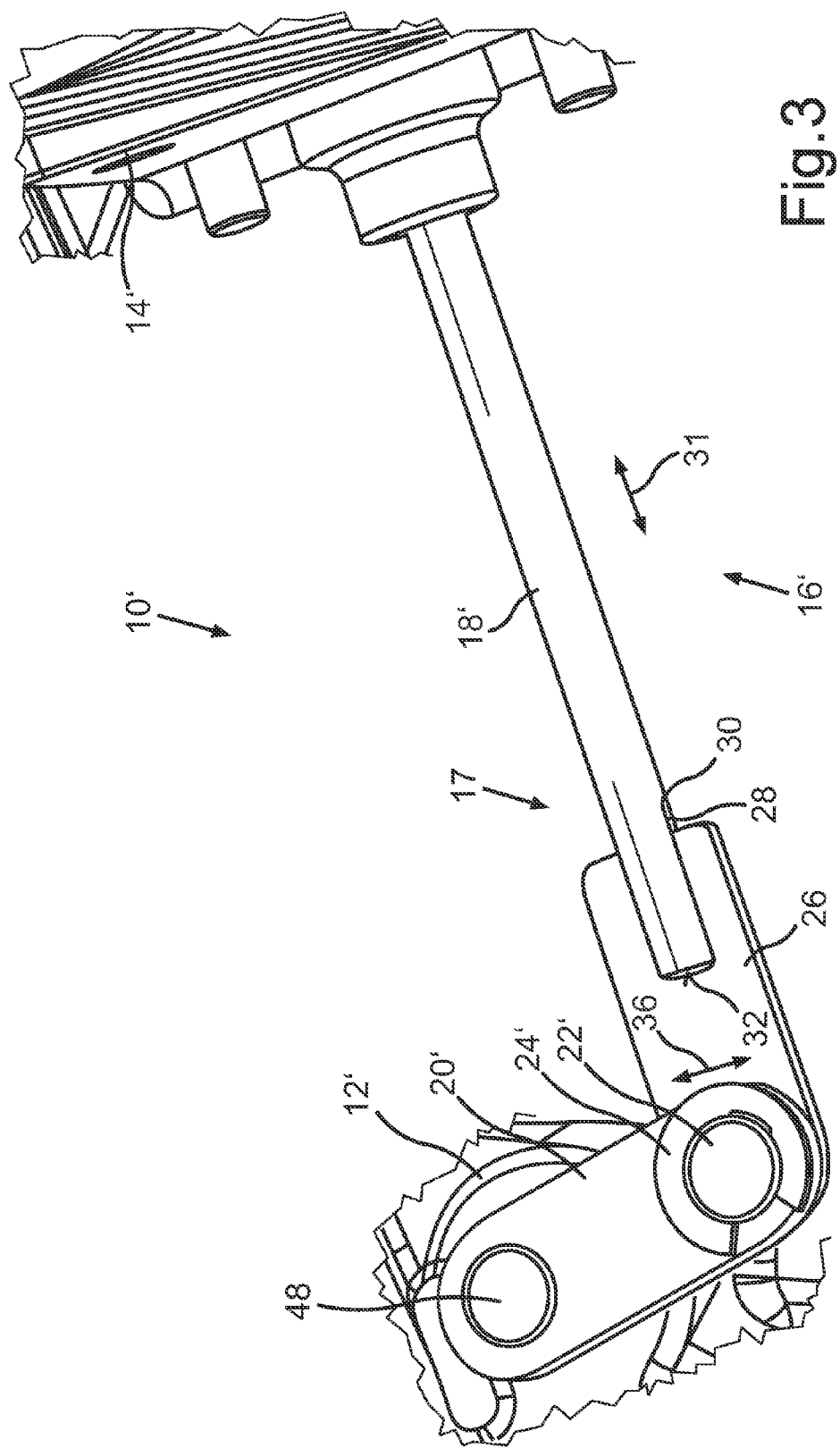

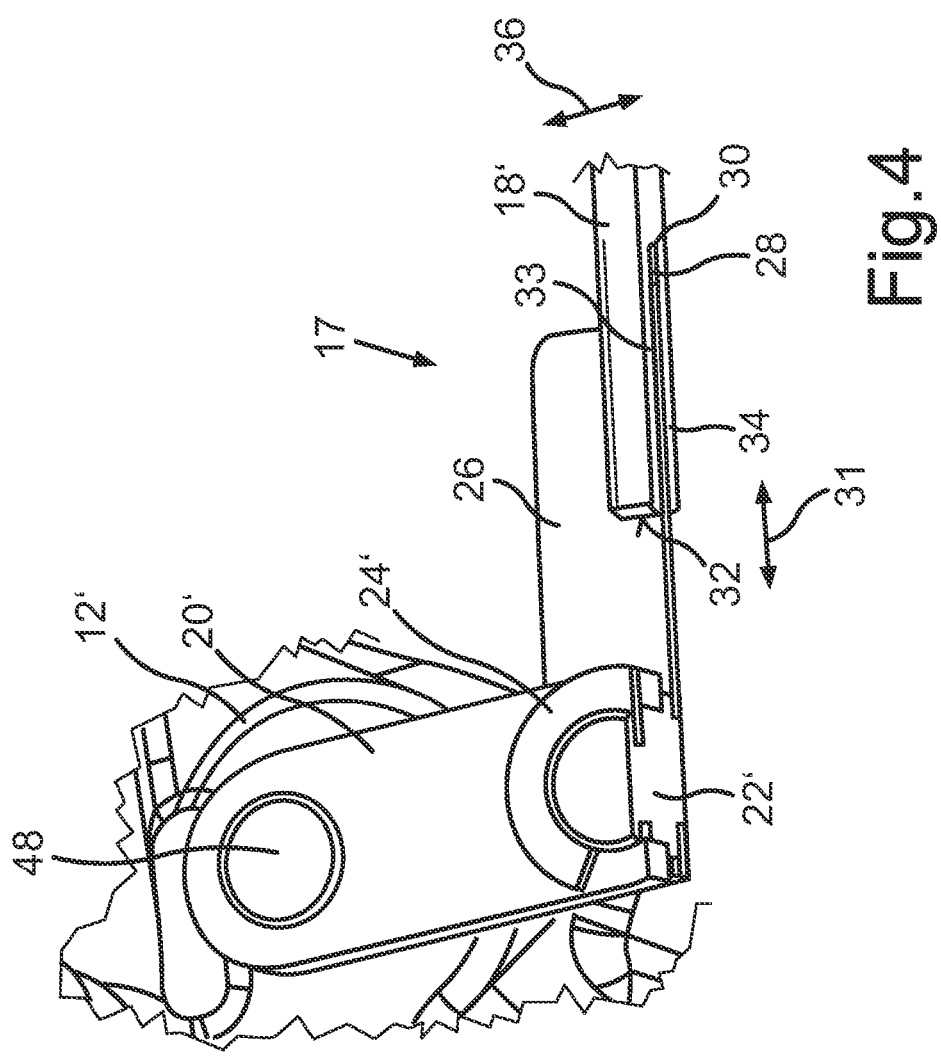

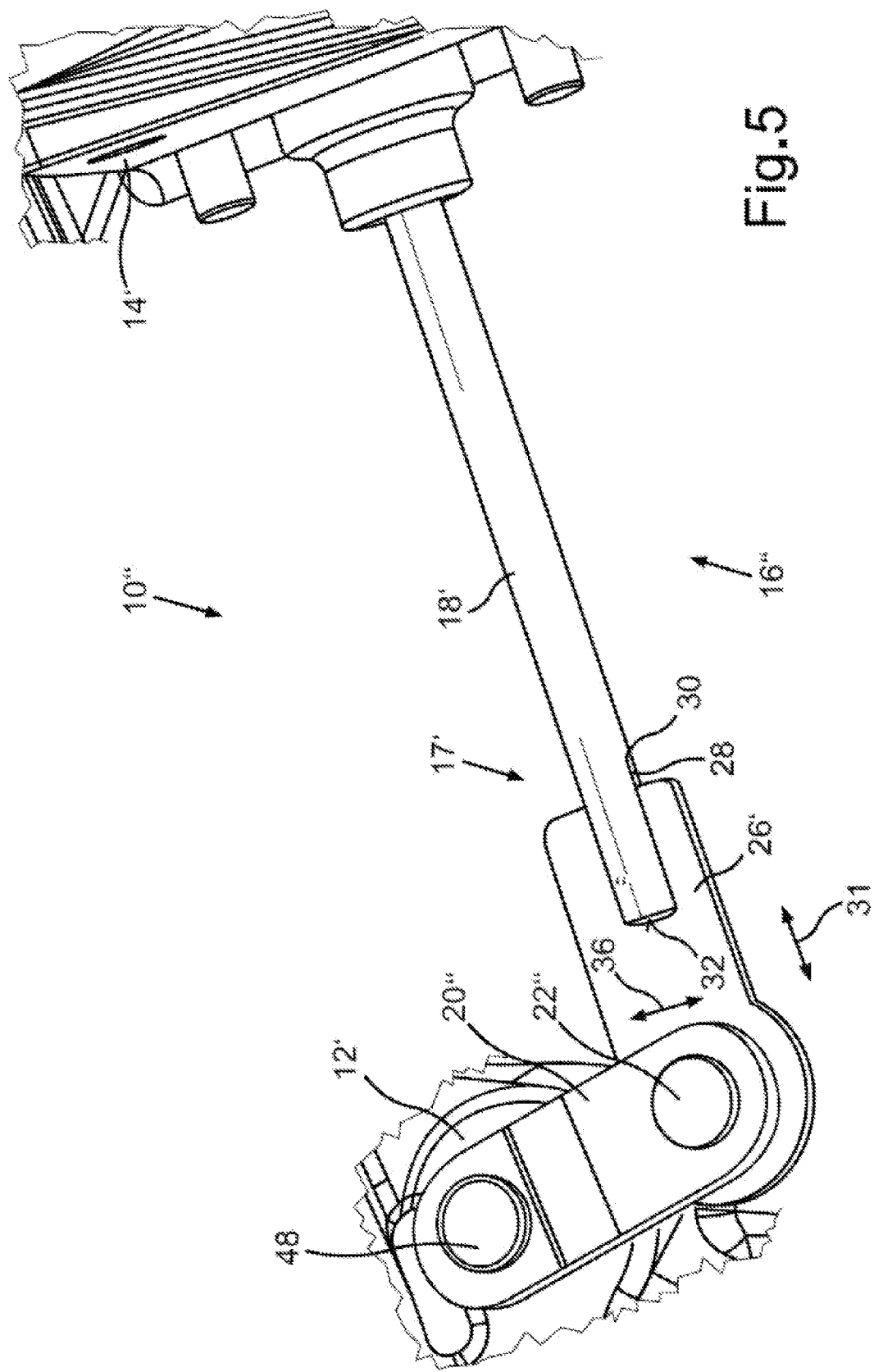

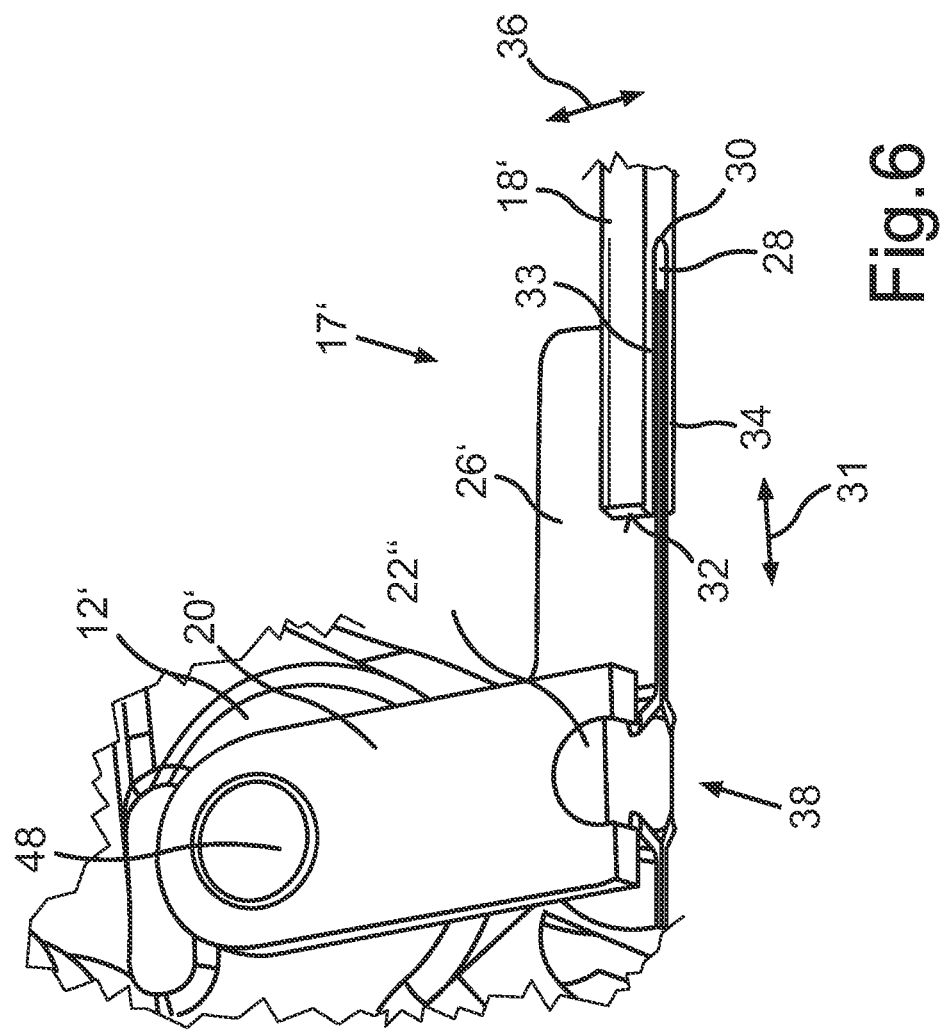

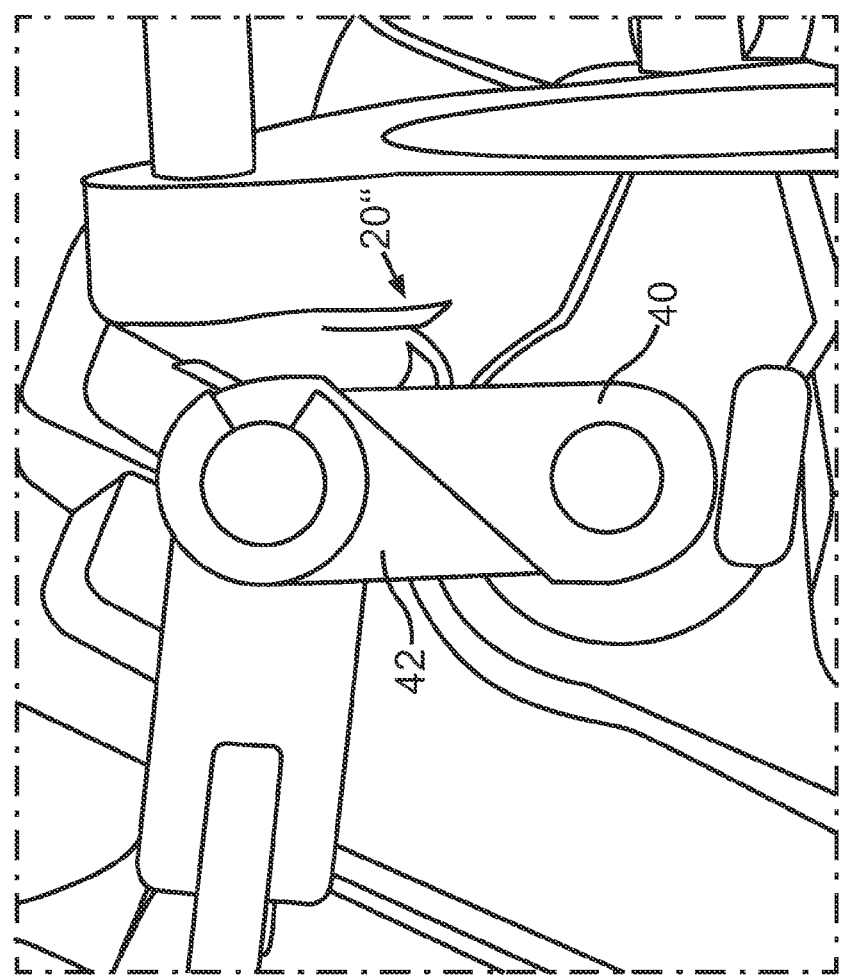

METHOD FOR MOUNTING AND SETTING AN ACTUATOR OF AN EXHAUST GAS TURBOCHARGER, AND AN ACTUATOR INTENDED FOR A CHARGING DEVICE

CROSS-REFERENCE TO RELATED APPLICATIONS

This application is a continuation, under 35 U.S.C. §120, of copending International Application No. PCT/DE2010/001028, filed Sep. 1, 2010, which designated the United States; this application also claims the priority, under 35 U.S.C. §119, of German Patent Application No. DE 10 2009 039 911.9, filed Sep. 3, 2009 and of German Patent Application No. DE 10 2009 054 241.8, filed Nov. 21, 2009; the prior applications are herewith incorporated by reference in their entirety.

BACKGROUND OF THE INVENTION

Field of the Invention

The invention relates to a method for mounting or setting an actuator of an exhaust gas turbocharger and to an actuator for a charging device, in particular an exhaust gas turbocharger.

During operation of an internal combustion engine with an exhaust gas turbocharger, a part flow of the exhaust gas is optionally guided past a turbine via a bypass channel for the turbine of the exhaust gas turbocharger. To this end, a bypass valve which is also called a wastegate valve for opening and closing the bypass channel is arranged in the bypass channel, which valve element is pressed against a valve seat in a closed state. In the case of a load request to the internal combustion engine, the valve is closed and is pressed with a predefined force against the valve seat, the force being selected in such a way that the bypass channel is closed as far as possible in a flow-tight and pressure-tight manner against the exhaust gas pressure of the internal combustion engine during the load request.

The boost pressure regulation in engines with exhaust gas turbocharging by way of an exhaust gas turbocharger takes place in exhaust gas turbochargers of this type through the use of pneumatically operating pressure actuators as actuating devices which have a defined spring prestress.

The development in these internal combustion engines is also characterized here increasingly by a high torque at relatively low rotational speeds and a delay-free response characteristic. These facts are allowed for by way of a design of the exhaust gas turbocharger, which design is optimized specifically for the lower rotational speed range. Exhaust gas turbochargers of this type are very small with regard to their throughput capacity in relation to the swept volume of the engine, with the result that they can already realize high pressure ratios across the charger at low exhaust gas mass flows. At high engine rotational speeds and great exhaust gas mass flows, correspondingly great exhaust gas quantities are guided past the turbine via the wastegate.

In the electrically operated wastegate actuator disclosed in German Patent Application Publication No. DE 10 2007 009 267 A1, it can be regulated independently of the pressures which prevail at the engine. Depending on the strength of the current, with which the electrically operated wastegate actuator is actuated, a more or less powerful actuating force acts on a mechanical actuating member of the wastegate valve.

German Patent Application Publication No. DE 10 2008 015 855 A1 discloses a method for operating an internal combustion engine having an exhaust gas turbocharger, a wastegate duct which is controlled by a wastegate valve being provided in the exhaust gas section in such a way that the wastegate duct bridges the turbine of the exhaust gas turbocharger. To this end, an actuator is provided for actuating the wastegate valve, the wastegate being opened in such a way during a transition from high load operation to part load or overrun operation that the pump output of the compressor which is assigned to the turbine is reduced.

German Patent Application Publication No. DE 10 2005 023 260 A1 discloses a method for regulating an exhaust gas turbocharger, an electrically actuable wastegate valve being provided for the turbine of the exhaust gas turbocharger. In contrast to a pressure sensor, the electric actuation makes a rapid change of the position of the wastegate valve possible. An operating point of the compressor is used as reference variable for regulating the electrically actuable wastegate valve of the exhaust gas turbocharger. As a result, a rapid pressure and rotational speed reduction can be brought about at the turbine of the exhaust gas turbocharger, as a result of which the danger to the pump of the exhaust gas turbocharger is prevented effectively during the transition from high load to part load or overrun operation.

German Patent Application Publication No. DE 10 2008 011 416 A1 relates to a turbocharger having a wastegate duct which can be opened and closed via an actuating device. The actuating device has a closing element which can be pivoted into the wastegate duct, in order to close the latter. The opening and closing of the wastegate takes place through the use of a flap which is controlled by a pneumatic actuator.

The regulation through the use of a pneumatic actuator comes with some disadvantages. Such disadvantages are, for example, the fluttering of the flap in the exhaust gas flow shortly before the opening pressure of the flap is reached and the possibly associated destruction of the flap seat. Moreover, regulation through the use of a control sensor is possible only if there is sufficient positive pressure or vacuum.

European Patent Document No. EP 1 714 064 B1 discloses a device for actuating a control element, it being possible for the control element to be moved through the use of an actuator and a guide pin being received on an actuating member of the actuator, which guide pin is guided on a supporting lever which can be pivoted about an articulation point and imparts a pivoting movement to a slotted lever in order to actuate the control element, and it being possible for the guide pin to be displaced within the slotted guide of the slotted lever. Here, the slotted lever and the supporting lever can be moved relative to one another. This known solution has a high complexity for production and for mounting, which results in high costs.

In practice, above all the assignment of the actuating device to the bypass valve through the use of the coupling element also proves to be decisive for the operational reliability and the function of the exhaust gas turbocharger.

For this purpose, German Patent Document No. DE 699 22 302 T2 proposes a welded joint between the actuating rod for the pressure control of an exhaust gas turbocharger and the lever arm. In order to set the lifting point, the bypass valve position is fixed temporarily in the bypass valve, by way of which a bypass path for the exhaust gas can be closed, and the pressure in a pneumatic actuator is increased to a desired pressure. In the thus closed position of the bypass valve, the end piece of the actuating rod is arranged within a cylindrical part section of the lever arm, and the relative position which is set in this way is immobilized by welding. The corresponding length of the actuating rod is therefore set automatically during mounting, with the result that there is no necessity to set the length of the actuating rod.

In practice, however, tolerance influences on account of the articulated connection of the lever arm and of the actuating rod through the use of the coupling element prove problematical, which tolerance influences can lead in practice to a situation where the closing and/or opening forces for the bypass valve are not dimensioned correctly, to be precise in such a way that the desired opening characteristic is not achieved.

One thought might be to reduce the tolerances, in order thus to avoid the deviation which results from the linking of the functional elements. Here, however, it is to be taken into consideration that the exhaust gas turbocharger is subjected to considerable thermal influences during operation, with the result that thermal expansions cannot be ruled out in principle. In order to avoid jamming of individual elements reliably here, tolerance dimensions are in fact required in principle.

SUMMARY OF THE INVENTION

It is accordingly an object of the invention to provide a method for mounting and setting an actuator which overcomes the above-mentioned disadvantages of the heretofore-known methods and in which tolerances which occur are largely eliminated. A further object of the invention is to provide an adjustable actuator which is suitable for the method and ensures optimum adjustability.

With the foregoing and other objects in view there is provided, in accordance with the invention, a method for mounting and/or setting an actuator of an exhaust gas turbocharger, the actuator having, in a kinematic coupling, an actuating device which serves to actuate a bypass valve and has an axially movable actuating rod which is connected, through the use of a coupling element, to an actuation section of the bypass valve, the method comprises first immobilizing an optimum position of the coupling element with respect to the actuating rod in dependence of a position of the bypass valve and the actuating device and subsequently fixing the optimum position by first adjustably connecting the actuation section and the actuating rod through the use of the coupling element, by subsequently moving the actuating device into a position which corresponds to its closed position, and by finally, through the use of a tool, introducing into the actuator, in a predefined relative position, a force which immobilizes the bypass valve in its closed position and by immobilizing the relative position set in this way between the actuation section and the actuating rod.

In other words, according to the invention, there is provided a method for mounting and/or setting an actuator (5, 10, 10', 10'', 10''', 10'''') of an exhaust gas turbocharger (2), the actuator (5, 10, 10', 10'', 10''', 10'''') having, in a kinematic coupling, an actuating device (6, 14, 14') which serves to actuate a bypass valve and has an axially movable actuating rod (8, 18, 18') which is connected by means of a coupling element (9, 26, 26', 26'') to an actuation section (4, 20, 20', 20'') of the bypass valve, which actuation section (4, 20, 20', 20'') is configured, in particular, as a lever arm, first of all an optimum position of the coupling element (9, 26, 26', 26'') with respect to the actuating rod (8, 18, 18') being immobilized depending on the position of the bypass valve and the actuating device (6, 14, 14') and the optimum position subsequently being fixed, wherein first of all the actuation section (4, 20, 20', 20'') and the actuating rod (8, 18, 18') are connected adjustably by means of the coupling element (9, 26, 26', 26''), subsequently the actuating device (6, 14, 14') is moved into a position which corresponds to its closed position, and finally, in the predefined relative position, a force (F) which immobilizes the bypass valve in its closed position is introduced into the actuator (5, 10, 10', 10'', 10''', 10'''') by means of a tool and the relative position set in this way between the actuation section (4, 20, 20', 20'') and the actuating rod (8, 18, 18') is immobilized.

According to the invention, a method is therefore provided, in which first of all the actuation section, which is configured in particular as a lever arm, and the actuating rod are connected adjustably through the use of the coupling element, subsequently the actuating device is moved into a position which corresponds to its closed position, and finally, in the predefined relative position, a force which immobilizes the bypass valve in its closed position is introduced into the actuator through the use of a tool and the relative position set in this way between the lever arm and the actuating rod is immobilized. Here, the invention proceeds from the finding that the disadvantageous effects of the system-induced tolerance dimensions can be eliminated in a surprisingly simple way by virtue of the fact that, before the final connection of the lever arm to the actuating rod through the use of the coupling element, not only is the actuating device moved into its position which corresponds to the closed bypass valve position, but also that the actuator, namely at least one of the kinematically coupled elements including the actuating device, actuating rod, coupling element and/or bypass valve, is loaded with an additional force by an external tool. In order to immobilize the correct relative position, an actuator is therefore used as auxiliary tool, the actuating force of which forces the bypass valve into the closed position.

A torque which acts on the actuation section of the bypass valve or on the coupling element could be produced through the use of the tool, in order thus to force the bypass valve into its closed position. In contrast, it is particularly promising if a force which acts in the axial direction of the actuating rod of the actuating device is introduced through the use of the tool and the relative position which is reached in this way between the actuation section and the actuating rod is immobilized during this introduction of force. As a result, the direction of action of the force which is introduced through the use of the tool corresponds to the actuating forces which occur during operation and are introduced through the use of the actuating device. An undesirable action of force which differs, in particular, from operating states which occur can be avoided as a result and, for example, an elastic deformation can be ruled out.

In principle, the actuating force of the tool could be introduced at any desired connecting point of the coupled elements of the actuator, for example also into the lever arm which is connected immovably to the bypass valve. In contrast, it is particularly advantageous if the force which is introduced through the use of the tool is introduced into the coupling element which is connected in a pivotably movable manner to the lever arm of the bypass valve, with the result that, in particular, the tolerances which occur in the articulated connection of the lever arm to the coupling element and are unavoidable on account of the required movability can be eliminated reliably. Here, the coupling element includes both a plate-shaped basic body and a pivot pin which preferably projects perpendicularly with respect to the basic body, with the result that the introduction of force can also take place into the pivot pin, for example in the region of its axial end region.

In principle, the method according to the invention can be used in an actuating device which can be loaded with pressure and, in particular, can therefore be actuated pneumatically. In contrast, it is particularly expedient if, before the immobilization of the relative position between the lever arm or the actuation section and the actuating rod, an electric actuating device is moved into a setpoint position by a corresponding actuation of the electric drive of the actuating device, with the result that the tolerances which occur within the motorized drive unit of the actuating device can therefore also be eliminated. Here, the setpoint position preferably differs from an internal stop of the actuating device, in order thus to ensure a reliable transmission of force through the use of the actuating rod even in the case of differing operation conditions. Here, the setpoint position is reached exclusively by current application, with the result that, in particular, no external actions of force are required for immobilizing the actuating device in the setpoint position of the electric wastegate actuator. Mounting and setting are simplified substantially as a result.

It is particularly promising here if the coupling element is first of all mounted movably with two degrees of freedom with respect to the actuating rod, subsequently the setpoint position is set in the axial direction and transversely with respect to the axial direction of the actuating rod and the position which is set in this way is immobilized by welding. In order therefore to correspondingly assign the closed position of the bypass valve the actuating rod position which is set through the use of the electric wastegate actuator, the actuating rod is first of all not yet immobilized in its axial position with respect to the actuation lever. Here, although the actuation section of the bypass valve is connected to the coupling element such that it can be moved pivotably, for example, via a hinged joint, the actuating rod can be fixed on the coupling element in different axial positions. To this end, the actuating rod is slotted, with the result that the coupling element can be pushed into the slit to different depths and an adjustability in the axial direction and in a transverse direction can thus be made possible. In an alternative embodiment, the coupling element has a receptacle for the actuating rod. This receptacle has an axial extent, in order to align and to fix the actuating rod in the required position. Here, the receptacle is preferably configured as a slot (slotted hole). A bolt or pin which is integrally formed or fixed on the actuating rod engages into this receptacle.

Another, likewise particularly promising modification is also achieved if the coupling element is connected to the actuating rod by way of a laser welded joint, the welded seam being made, in particular, on both sides of the actuating rod parallel to its center axis in the transition region to the coupling element, in order thus to keep the volume to be fused as low as possible.

Here, it has already proved advantageous, in order to avoid undesirable thermal influences, if the region to be welded is cooled during the welding, for example through the use of an air flow which is applied in a targeted manner.

Another, likewise particularly practice-oriented modification is achieved if a test of the actual position with respect to the setpoint position of the actuating rod is carried out through the use of a displacement sensor. Here, the displacement sensor can be configured both as an integral constituent part of the actuator, in particular of the electric actuating device, or as an external tool. In this way, a simple test of the closed and open position by way of the displacement sensor and of the voltage profile which is detected at the same time and correlates with the lift can take place. In the setting test, the electric actuating device is supplied with an electric voltage and the actual position is detected as a function of the applied voltage.

Furthermore, it proves to be particularly helpful if a deflection of the actuating rod out of its setpoint axis during mounting or setting is avoided through the use of a concentricity guiding tool. This ensures an aligned, that is to say concentric arrangement of the actuating rod with respect to a guide sleeve of the actuating device, by a deflection of the actuating rod transversely with respect to its main extent being prevented. In this way, undesirably high friction or even bending of the actuating device is ruled out during operation. Here, the concentricity guiding tool bears against at least three points on the circumference of the actuating rod on the one side and against the housing or the sliding or guide sleeve of the actuating device on the other side.

With the objects of the invention in view there is also provided, in combination with a charging device having at least one valve element, an actuator for the charging device, the actuator including at least one actuating device and a connecting device with a tolerance compensation device, wherein the at least one valve element is coupled via the connecting device to the at least one actuating device and can be actuated by the at least one actuating device, the tolerance compensation device including at least one coupling element which is connected via a push-in connection to at least one actuating rod of the tolerance compensation device, the push-in connection being configured substantially perpendicularly with respect to a circumferential face along the perimeter of the at least one coupling element.

In other words, according to the invention, there is also provided an actuator (5, 10, 10', 10", 10''', 10'''') for a charging device, in particular an exhaust gas turbocharger (2), having at least one valve element, in particular a wastegate, which is coupled via a connecting device (16, 16', 16", 16''', 16'''') to at least one actuating device (6, 14, 14') of the actuator (5, 10, 10', 10", 10''', 10'''') and can be actuated by the latter, a tolerance compensation device (17, 17', 17", 17''') being provided in the region of the connecting device (16, 16', 16", 16''', 16''''), which tolerance compensation device (17, 17', 17", 17''') includes at least one coupling element (9, 26, 26', 26") which is connected via a push-in connection to at least one actuating rod (18, 18') of the tolerance compensation device (17, 17', 17", 17'''), wherein the push-in connection is configured substantially perpendicularly with respect to a circumferential face along the perimeter of the coupling element (9, 26, 26', 26").

The above-mentioned further object of the invention is achieved by way of an actuator for a charging device, in particular an exhaust gas turbocharger, having at least one valve element, in particular a wastegate, which is coupled via a connecting device to at least one actuating device of the actuator and can be actuated by the latter, by virtue of the fact that the push-in connection is configured substantially perpendicularly with respect to a circumferential face of the coupling element. As a result of the provision of this tolerance compensation device, a necessary tolerance compensation of the actuator is moved from the actuating device into the region of the connecting device. This means a substantially lower production and mounting outlay, in particular in comparison to the known solutions which are described in the introduction, which results in a cost reduction for the actuator. This cost reduction is based both on a lower number of parts and in much less complicated manufacturing of the components of the tolerance compensation device.

The component tolerances then no longer have to be absorbed by the actuating device, which also simplifies the construction of the actuating device. This is likewise associated with a further cost reduction, which lowers the overall costs of the actuator by a further amount.

It is to be noted at this point that this actuating device can be, for example, a pressure-actuated pressure cell. An exhaust gas turbocharger and, in particular, a turbine of the exhaust gas turbocharger can be bypassed through the use of the actuator, as a result of which a boost pressure for a corresponding internal combustion engine can be set.

Here, the actuating device performs a substantially linear movement which is converted by the connecting device into a rotational movement of the valve element. As a result, the valve element can be actuated and a bypass channel for bypassing the charging device can be closed or opened.

Here, the tolerance compensation device includes at least one coupling element which is connected via a push-in connection to at least one rod element of the tolerance compensation device. This therefore means that the valve element is coupled to the actuating device via the coupling element and the rod element. Here, the coupling element can be configured in such a way that the pivoting range of the coupling element results in as small a translational path as possible transversely with respect to the rod axis. The push-in connection between the rod element and the coupling element permits a particularly simple mounting without an additional mounting tool, which results in a mounting with low outlay in both cost and time terms. This is very beneficial to the overall costs of the actuator.

In order to keep an installation space requirement low, in particular perpendicularly with respect to the direction of longitudinal extent of the rod element, the push-in connection is configured substantially perpendicularly with respect to a circumferential face of one coupling element. The resulting, low installation space requirement of the actuator avoids packaging problems, which is extremely advantageous, in particular, in a space-critical region such as in an engine compartment, in which the actuator according to the invention is used as a rule.

In accordance with another feature of the invention, the push-in connection includes a recess, in which the coupling element is received at least in regions thereof, and the recess is formed in the actuating rod from a side of the actuating rod, which side faces the coupling element.

If the push-in connection includes a recess, in which the coupling element or rod element is received at least in regions, the above-described advantages are accompanied by the further advantage that a particularly fixed and stable connection between the rod element and the coupling element is realized as a result. This reduces the probability of failure for the actuator which is important for operation of the charging device, and avoids undesirable and expensive repairs. This also benefits the driver of the motor vehicle having the actuator according to the invention, since undesirable workshop visits can be avoided and service intervals can be extended.

One particularly advantageous embodiment of the invention provides that the recess is formed in the at least one rod element from a side of the rod element, which side faces the coupling element. This therefore means that the recess is, for example, milled into the rod element from that side or is made during a casting process. This further simplifies the mounting of the actuator.

If a wall of the recess is spaced apart from the coupling element, which wall faces the coupling element in the direction of the longitudinal extent of the rod element, this affords the advantage that the connecting device can be mounted not only simply and inexpensively as a result, but rather also that a tolerance compensation is realized which is particularly simple but at the same time efficient. Before the mounting, the coupling element can therefore be pushed into the rod element and can be displaced in the direction of the longitudinal extent of the rod element, as a result of which tolerances can be compensated for, in particular in the direction of the longitudinal extent of the rod element. The tolerance compensation which is thus moved into the region of the connecting device by the actuating device is therefore favorable in terms of time and cost, but is nevertheless also no less efficient.

As described above, for example, the push-in connection therefore has a recess, in which the coupling element is received at least in regions. A correspondingly reversed arrangement is readily possible, however, in the context of the actuator according to the invention. It is thus provided in one advantageous embodiment of the invention that the push-in connection includes a recess, in which the at least one rod element is received at least in regions. The rod element and the coupling element are therefore, for example, connected to one another in such a way that the rod element is pushed into a recess, in particular a slot (slotted hole), of the coupling element and is received by the latter. The embodiments and advantages which are described in conjunction with the receiving of the coupling element in a recess apply in a correspondingly analogous manner to the receiving of the rod element in a recess. Also as a result, this represents a tolerance compensation device which is not only simple and therefore inexpensive, but also likewise highly efficient.

In accordance with another feature of the invention, the push-in connection includes a recess formed in the coupling element from a side of the coupling element, which side faces the actuating rod.

For both of these aspects of the actuator according to the invention, a further embodiment of the invention is considered to be particularly advantageous, in which the recess is formed by three walls and has three open sides. This configuration of the recess makes the tolerance compensation in two translational directions possible by translational displacement, for example, of the coupling element in the recess. The recess which is configured in this way therefore makes in each case a displacement in two translational directions possible, the first translational direction extending, for example, in the direction of the longitudinal extent of the rod element and the second translational direction extending perpendicularly with respect to the direction of the longitudinal extent of the rod element and perpendicularly with respect to a base area of the coupling element. As a result, a tolerance compensation device is provided which is inexpensive, efficient and, as it were, neutral in terms of installation space.

A tolerance compensation of rotational degrees of freedom of the connecting device is realized by the fact that, in one particularly advantageous embodiment of the invention, the tolerance compensation device includes at least one ball joint, via which the valve element is coupled to the actuating device. In combination with the above-described embodiment of the recess, a tolerance compensation is realized in two translational directions and in the rotational directions as a result. In one advantageous embodiment of the invention, a tolerance compensation in the third remaining translational direction is realized by the fact that the tolerance compensation device includes at least one journal-shaped pivot pin element which is mounted displaceably. This displaceability is configured, in particular, perpendicularly with respect to the above-described directions, in which the translational tolerance compensation is realized. The tolerance compensation in all directions is therefore provided inexpensively and without an increased installation space requirement.

If the tolerance compensation device includes at least one actuation section, through the use of which a substantially linear movement of the rod element can be converted into a rotational movement of the valve element, the forming of the lever element from two part actuation sections, which are in operative connection via faces which extend obliquely with respect to the direction of the longitudinal extent of the actuation section, affords the advantage that a tolerance compensation in three translational directions is provided as a result in a simple and therefore very inexpensive way. Here, the faces which extend obliquely with respect to the direction of the longitudinal extent of the actuation section make a tolerance compensation in two translational directions possible, whereas a tolerance compensation in the third direction which extends perpendicularly with respect to the two translational directions is possible as a result of a material thickness of the actuation section. This type of tolerance compensation represents a minimum of components to be modified, which is particularly beneficial to a cost reduction of the actuator according to the invention.

In accordance with another feature of the invention, the pivot pin element is mounted such that it can be displaced substantially perpendicularly with respect to a base area of the coupling element.

In accordance with a further feature of the invention, the tolerance compensation device includes at least one journal-shaped pivot pin element which is connected via a push-in connection to the coupling element and/or to an actuation section of the tolerance compensation device.

In accordance with another feature of the invention, the push-in connection of the journal-shaped pivot pin element is configured substantially perpendicularly with respect to a base area of the coupling element.

In accordance with another feature of the invention, the tolerance compensation device includes an actuation section, through which a substantially linear movement of the actuating rod can be converted into a rotational movement of the valve element, and wherein the journal-shaped pivot pin element is connected via in each case a welded joint to the coupling element and/or to the actuation section.

In a further embodiment of the invention, it is provided that, for the fixed and function-fulfilling connection of the coupling element to the rod element, a welded joint is provided between the two elements, the welded joint being formed, for example, by a gentle welding process. Here, a gentle welding process means a welding process which has only a small introduction of energy into the components to be welded, in order to avoid distortion of the components and a tolerance deviation which is possibly produced from this. Furthermore, joining technologies such as brazing, clamping or the like are also possible.

An electric actuating device is preferably provided. If the actuating rod has a slot-like groove on the end side, in which groove the coupling element can be fixed in different positions in the direction of the longitudinal axis of the actuating rod and transversely with respect to its axial direction, simple axial adjustability of the connection between the actuating rod and the coupling element which can be introduced on the end side into the groove is achieved, by it being possible for the coupling element to be introduced if required to a different extent into the groove and to be fixed there. At the same time, as a result, an adjustability transversely with respect to the longitudinal axis of the actuating rod is also made possible, by it being possible for the coupling element to be displaced laterally in the groove, with the result that a possible offset of the actuating rod with respect to an articulation point can be compensated for effortlessly by this lateral adjustability. Two degrees of freedom are therefore realized.

In principle, the coupling element could have virtually any desired configuration and, in particular, could have merely a projection which can be introduced into the groove. In contrast, it is particularly advantageous if the coupling element has a flat plate with a pivot pin which projects with respect to the plate and for its part is coupled kinematically to the lever arm of the bypass valve.

Furthermore, it proves to be particularly promising if the actuating device is arranged on a compressor side and the bypass valve is arranged on a turbine side of the exhaust gas turbocharger, with the result that undesirable thermal loads of the electric actuating device are largely ruled out.

Further advantages, features and details of the invention result from the following description of a plurality of exemplary embodiments and using the drawings. The features and combinations of features stated above in the description and the features and combinations of features stated in the following text in the description of the figures and/or shown solely in the figures can be used not only in the respectively specified combination, but rather also in other combinations or on their own, without departing from the scope of the invention.

Other features which are considered as characteristic for the invention are set forth in the appended claims.

Although the invention is illustrated and described herein as embodied in a method for mounting and setting an actuator of an exhaust gas turbocharger, and an actuator intended for a charging device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a perspective view of details of an alternative embodiment of an actuator in accordance with the invention;

FIG. 4 is a perspective sectional view of details of an actuator according to FIG. 3 in accordance with the invention;

FIG. 5 is a perspective view of details of an alternative embodiment of an actuator according to FIG. 3 in accordance with the invention;

FIG. 6 is a perspective sectional view of details of the actuator according to FIG. 5 in accordance with the invention;

FIG. 12 is a further perspective view of details of the actuator according to FIG. 10 in accordance with the invention.

DESCRIPTION OF THE PREFERRED EMBODIMENTS

Figure 1:
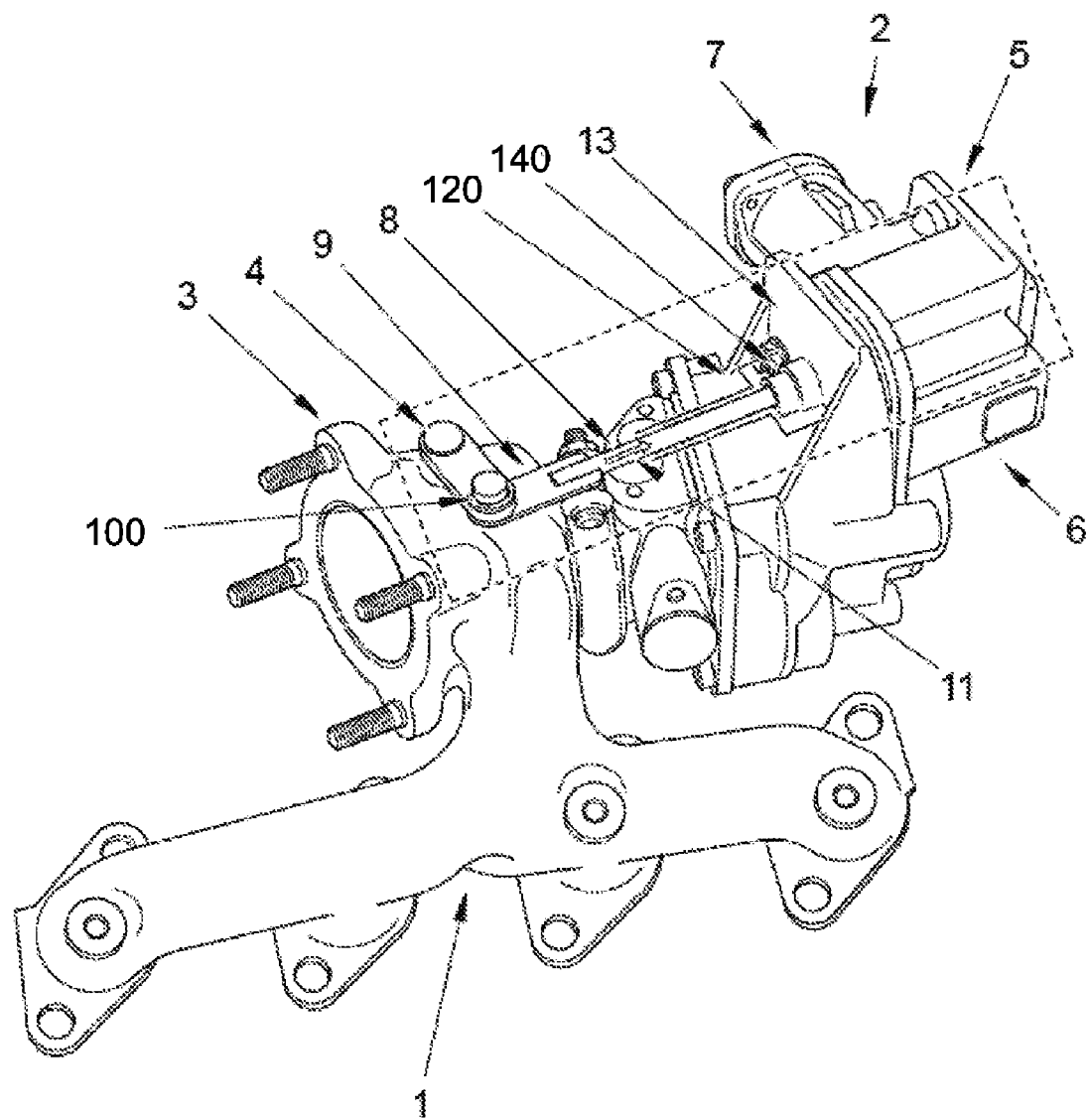
FIG. 1 is a perspective view of an actuator of an exhaust gas turbocharger in accordance with the invention.

Referring now to the figures of the drawings in detail and first, particularly, to FIG. 1 thereof, there is shown a perspective illustration of an exhaust gas turbocharger 2 which is arranged on a housing 1 of an exhaust gas manifold of an internal combustion engine (not shown in further detail). A bypass for the exhaust gas is provided on the turbine side 3 of the exhaust gas turbocharger 2, which turbine side 3 is assigned to the housing 1, through which bypass an adjustable part flow of the exhaust gas can be guided around a turbine (not shown) of the exhaust gas turbocharger 2 through the use of a bypass valve (not shown in further detail). The bypass valve is connected non-releasably to an actuation section 4 which is configured as a lever arm, in order thus for it to be possible to introduce the pivoting movement from outside, which pivoting movement is required to set the bypass valve. The actuation takes place through the use of an actuator 5, the actuating device 6 of which is arranged on a compressor side 7 of the exhaust gas turbocharger 2. As can be seen, the actuating device 6 has an axially movable actuating rod 8 which is connected to a coupling element 9 which is embodied as a metal sheet and for its part is connected to the actuation section 4 of the bypass valve through the use of a pivot pin (pivot axis) 100 of the coupling element 9, which pivot axis is embodied as a pin. The actuating rod 8 and the coupling element 9 together form a tolerance compensation device. In order to close the bypass valve, a tensile force which acts in the arrow direction 11 is applied by the actuating device 6 through the use of the actuating rod 8 and, as a result, the bypass valve is moved into the closed position or is fixed there. In order for it to be possible to reliably maintain the desired closed position of the bypass valve when there is a predefined actuation of the actuating device 6, the coupling element 9 is initially still connected displaceably to the actuating rod 8. Therefore, the optimum setting can take place in a first step and the final relative fixing can take place in a second step. First of all, for setting purposes, a concentricity guiding tool 120 is placed onto a sliding guide 140 which projects with respect to a fixing plate 13 of the actuating device 6. A concentric orientation of the actuating rod 8 with respect to the sliding guide 140 is ensured by the fact that the concentricity guiding tool 120 at the same time bears against the circumference of the actuating rod 8. This is advantageous, in order to keep the tolerance compensation low in the guide sleeve of the actuating device 6.

Figure 2A:
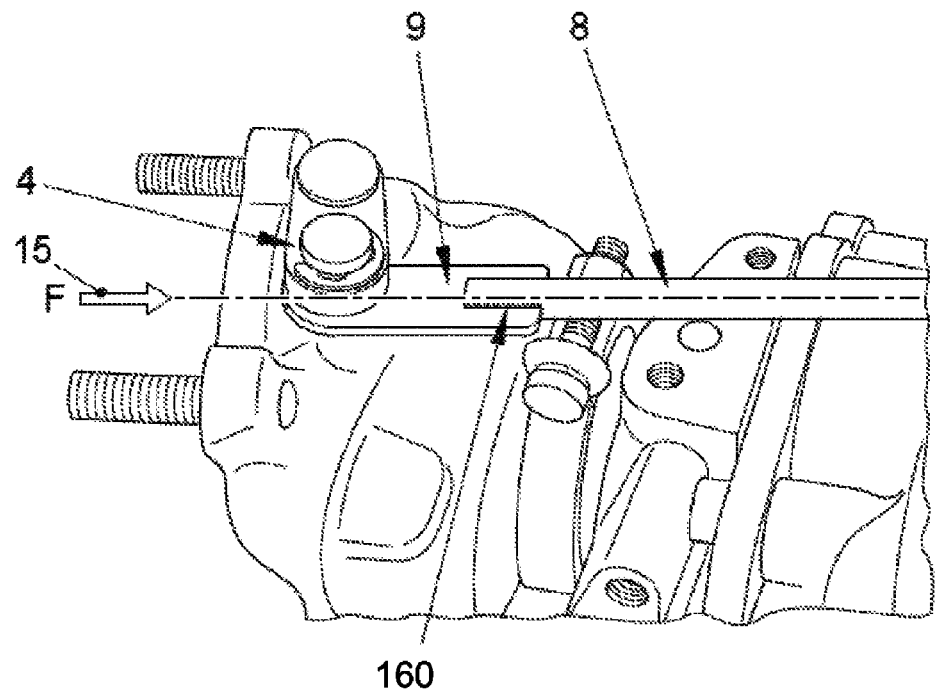
FIG. 2a is an enlarged view of a coupling element of the actuator in accordance with the invention which is shown in FIG. 1.
Figure 2B:
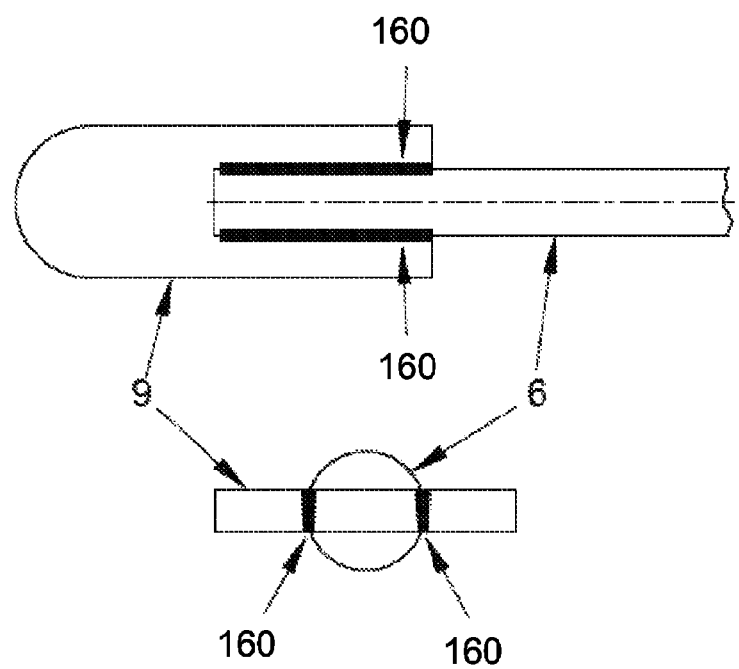
FIG. 2b is a plan view and a sectional side view of the coupling element which is shown in FIG. 2a and is welded to an actuating rod in accordance with the invention.

In the next work step which is shown in greater detail using FIG. 2a, the relative setting of the coupling element 9 with respect to the actuating rod 8 takes place. In a deviation from the visibly already made welded joint 160 of the two elements which is shown in FIG. 2b, these elements are initially connected such that they can still be moved for setting purposes. To this end, the actuating rod 8 has an end-side groove, into which the coupling element 9 is pivoted laterally, which coupling element 9 has previously already been connected to the actuation section 4 in a pivotably movable manner. As a result, relative movability is made possible both in the axial direction of the actuating rod 8 and transversely with respect thereto, in accordance with the course of the groove bottom. Before the fixing, first of all that position of the actuating device 6 which corresponds to the closed position is set by application of the corresponding voltage to the electric actuating device 6. The position which is set in this way is selected to be different from an internal stop of the actuating device 6, in order to make a sufficient adjusting travel possible even in the case of changing operating conditions. Next, a prestressing force F is applied to the coupling element 9 in the arrow direction 15, coaxially with respect to the actuating rod 8, through the use of a tool which is configured as a pneumatic actuator. As a result, firstly the bypass valve is forced into the closed position through the use of the actuation section 4 and secondly tolerances which occur in the system of the kinematically coupled elements are eliminated, in order thus to substantially improve the positional accuracy during later operation of the exhaust gas turbocharger 2. In the position which is set in this way, the welded joint 160 is applied through the use of a welding tool (not shown). The electric voltage which is applied to the actuating device 6 is controlled in a control loop. For this purpose, a positional sensor (not shown) which is integrated into the actuating device 6 supplies a response about the current actual position of the wastegate valve and/or of the coupling element 9 which is connected thereto. The set point here is the corresponding sensor characteristic curve.

As can be seen in FIG. 2b using a basic illustration in a plan view and a sectional side view, the welded joint 160 is made by two welded seams parallel to the center axis of the actuating rod 6 in the contact region with the coupling element 9, in order thus to keep the material volume to be melted and possible thermal distortions as low as possible. It can be seen that the two welded joints 160 are completely fused, that is to say penetrate the coupling element completely. This considerably increases the strength of the welded joint which is provided in this way.

Temporally after the welding is concluded, a setting test is carried out in the following way. First of all, the electric actuating device 6 is actuated in the direction of the closed wastegate by way of a closing current which is controlled via a pulse-width modulated signal (pwm signal), it being necessary for the pwm signal to correspond to that which is applied in an engine control unit, in order that the nominal forces, for example in the actuating rod 8, and a set adaptation value in this setting test process are identical to the later running operation. If the positional sensor reports that the closed wastegate position has been reached, the closing current which is necessary for this purpose and the associated pwm signal have to be maintained for a predefined time and the measurements of the positional sensor responses which are carried out in this time have to lie within setting set point tolerances. Setting set point tolerances of this type can lie, for example, in the range of +/−0.05 V.

In a further step of the setting test, the electric actuating device 6 is started with a comparatively small pwm signal, which corresponds to a relatively slow opening movement. During this, what is known as the rod displacement, that is to say the exact position of the linkage with nominal current application to the actuating device 6, is detected at the opposite end of the measuring chain, that is to say in the region of the pin which connects the coupling element 9 to the linkage of the wastegate valve, via a displacement sensor, for example, through the use of a laser measurement. The above-described test process is carried out without the concentricity guiding tool 120.

FIG. 3 shows a further actuator 10' for an exhaust gas turbocharger, which actuator 10' includes a valve element in the form of a wastegate which is received in a housing 12'. As has already been explained in greater detail in the above text, this valve element serves to close and open a bypass channel in order to bypass a turbine of the exhaust gas turbocharger, as a consequence of which a boost pressure can be set for a corresponding internal combustion engine. Here, the valve element is coupled via a connecting device 16' to an actuating device 14'. The actuating device 14' of the actuator 10' is configured as a pressure cell which can be actuated by pressure loading.

A tolerance compensation device 17 is provided in the region of the connecting device 16', by which tolerance compensation device 17 a compensation of tolerances of the components is moved from the actuating device 14' into the region of the connecting device 16'. This significantly reduces outlay for a tolerance compensation and for the actuating device 14', as a result of which a cost reduction is made possible in comparison with the prior art.

The connecting device 16' includes a rod element, in the form of an actuating rod 18', and a coupling element 26 which are connected to one another via the tolerance compensation device 17. To this end, the tolerance compensation device has a recess 28 in the actuating rod 18', which recess 28 is formed in the actuating rod 18' in the direction of the longitudinal extent of the actuating rod 18' according to a direction arrow 31 from a side 32 of the actuating rod 18', which side 32 faces the coupling element 26. In addition, a wall 30 of the recess 28 is spaced apart from the coupling element 26, which wall 30 faces the coupling element 26 in the longitudinal extent of the actuating rod 18', as a result of which a tolerance compensation is provided in a translational direction according to the direction arrow 31.

As can be gathered, in particular, from FIG. 4, the recess 28 is formed by three walls 30, 33 and 34 and has three open sides, as a result of which not only is the tolerance compensation realized in a translational direction according to the direction arrow 31, but also a tolerance compensation is realized in a further translational direction according to a direction arrow 36.

Here, the coupling element 26 and the actuating rod 18' are connected to one another via a welded joint.

The tolerance compensation device 17 therefore permits a compensation of tolerances in the direction of the longitudinal extent of the actuating rod 18' according to the direction arrow 31 and a lateral deflection perpendicularly with respect thereto according to the direction arrow 36.

Furthermore, the valve element is coupled to the actuating device via an actuation section 20' which converts a linear movement of the actuating device and therefore of the connecting device into a rotational movement of the valve element. Here, the connection of the actuation section 20' to the coupling element 26 is realized by a journal-shaped pivot pin 22' which is prevented by a securing ring 24' from sliding out of a corresponding hole of the actuation section 20'.

FIG. 5 shows an alternative embodiment of an actuator 10" in accordance with the actuator 10' in FIG. 3. The difference between the actuator 10' and the actuator 10" lies in the connecting device 16", in the region of which a tolerance compensation device 17' is provided. In this tolerance compensation device 17', the coupling element 26' is then connected to the actuation section 20" via a journal-shaped pivot pin 22".

As is clarified, in particular, in conjunction with FIG. 6, the journal-shaped pivot pin 22" is mounted in a corresponding recess, in particular a hole, of the actuation section 20' such that it can be displaced substantially perpendicularly with respect to a base area of the coupling element 26'. As a result, a translational tolerance compensation is made possible in the third remaining translational direction. This translational direction therefore lies perpendicularly with respect to the translational directions of the tolerance compensation which is made possible by the recess 28 of the actuating rod 18'.

In addition, the tolerance compensation device 17' includes a ball joint 38, via which the valve element is coupled to the actuating device. The ball joint 38 permits a tolerance compensation in a rotational manner by releasing rotational degrees of freedom of the connecting device and/or the tolerance compensation device 17'.

Figure 7:
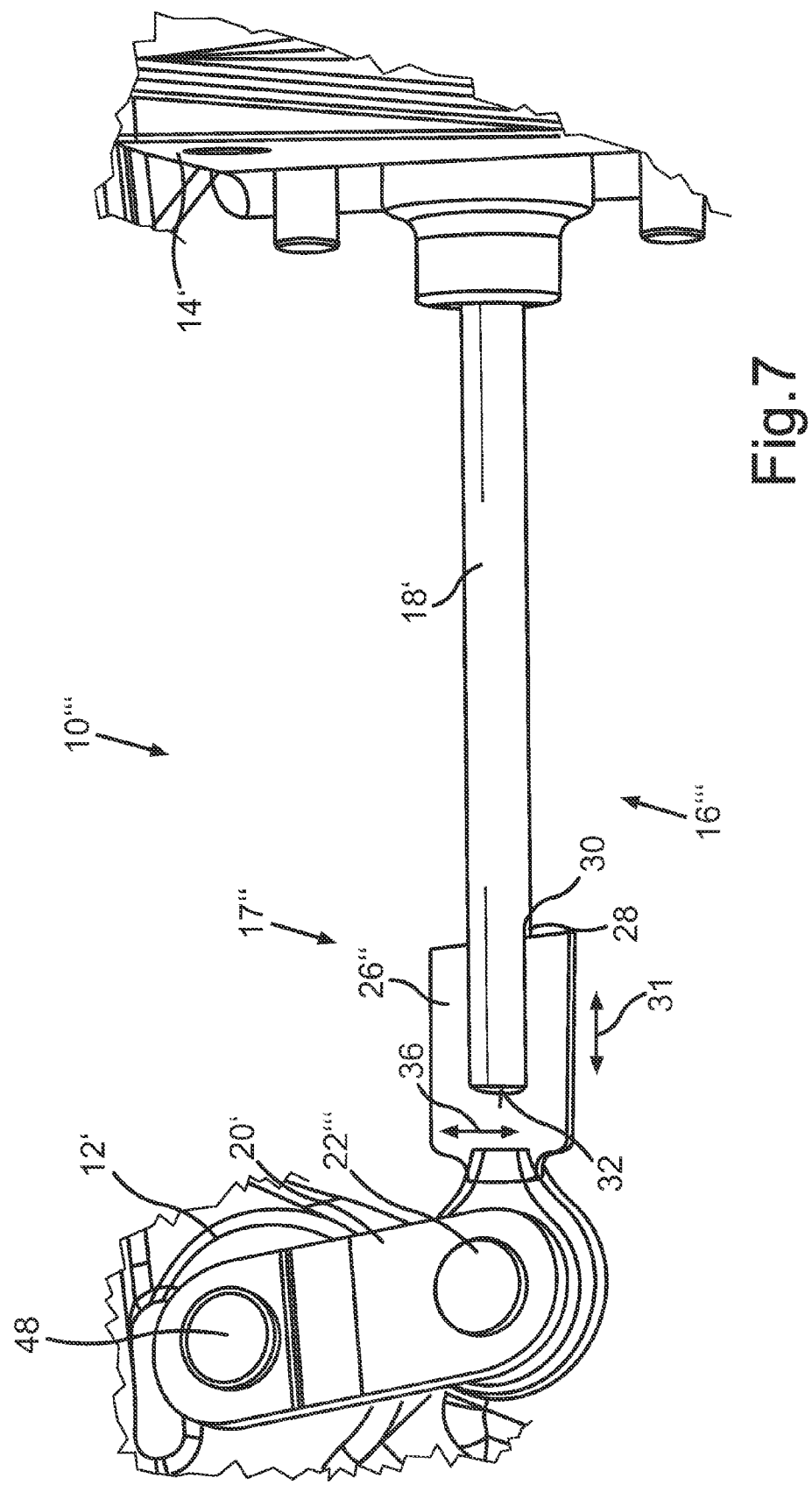
FIG. 7 is a perspective view of details of a further alternative embodiment of an actuator according to FIG. 3 in accordance with the invention.
Figure 8:
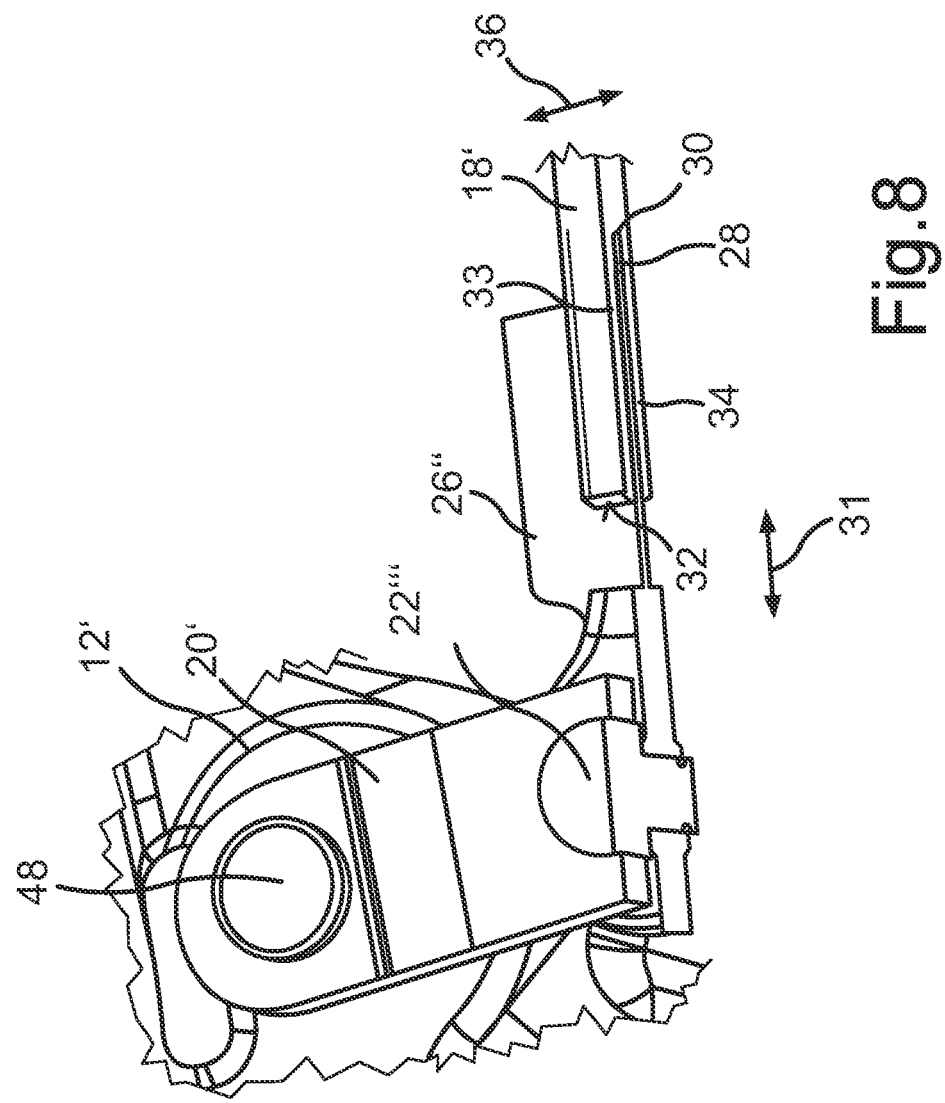
FIG. 8 is a perspective sectional view of details of the actuator according to FIG. 7 in accordance with the invention.

FIG. 7 shows a further alternative embodiment of an actuator 10''' according to FIGS. 3 and 5, the alternative embodiment including a further alternative embodiment of a connecting device 16''', in which the valve element is coupled to the actuating device 14' via a tolerance compensation device 17" which includes an alternative embodiment of a coupling element 26". The coupling element 26" is connected to the actuation section 20' via a journal-shaped pivot pin 22''', which can be gathered, in particular, from FIG. 8.

It is to be noted at this point that, should no displaceable mounting of the journal-shaped pivot pin 22', 22" or 22''' of the respective connecting device 16', 16" or 16''' be provided on the actuation section 20' and/or on the coupling element 26, 26' or 26", the pivot pin 22', 22" or 22''' can be connected via in each case a welded joint to the corresponding actuation section 20' and/or to the corresponding coupling element 26, 26' or 26". Just like an optionally present welded joint between the coupling element 26, 26' or 26" and the actuating rod 18', this welded joint can be made by a gentle welding process with only a small introduction of heat. The making or formation of the welded joint between the pivot pin 22', 22" or 22''' and the corresponding actuation section 20' and/or the coupling element 26, 26' or 26" advantageously follows in a same step as also the welded joint between the coupling element 26, 26' or 26" and the actuating rod 18' in order to realize the described tolerance compensation.

Figure 9:
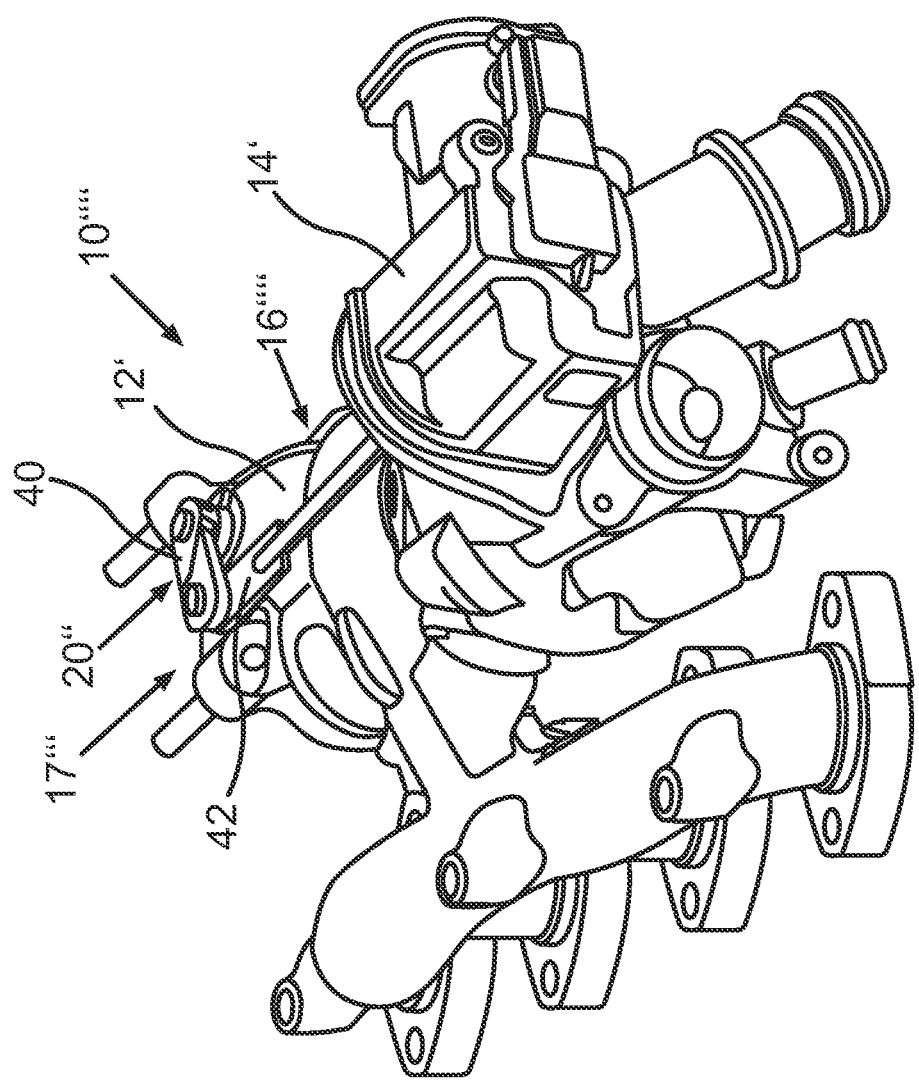
FIG. 9 is a perspective view of an exhaust gas turbocharger with a further alternative embodiment of an actuator according to FIG. 3 in accordance with the invention.

FIG. 9 shows a further alternative embodiment of an actuator 10'''' according to FIGS. 3, 5 and 7, in which embodiment the valve element is likewise connected via a connecting device 16'''' to the actuating device 14'. The connecting device 16'''' differs from the connecting devices 16', 16" and 16''' to the effect that a tolerance compensation device 17''' is provided in its region, which tolerance compensation device 17''' includes an alternative embodiment of an actuation section 20" which converts a linear movement of the actuating device 14' into a rotational movement of the valve element.

Figure 10:
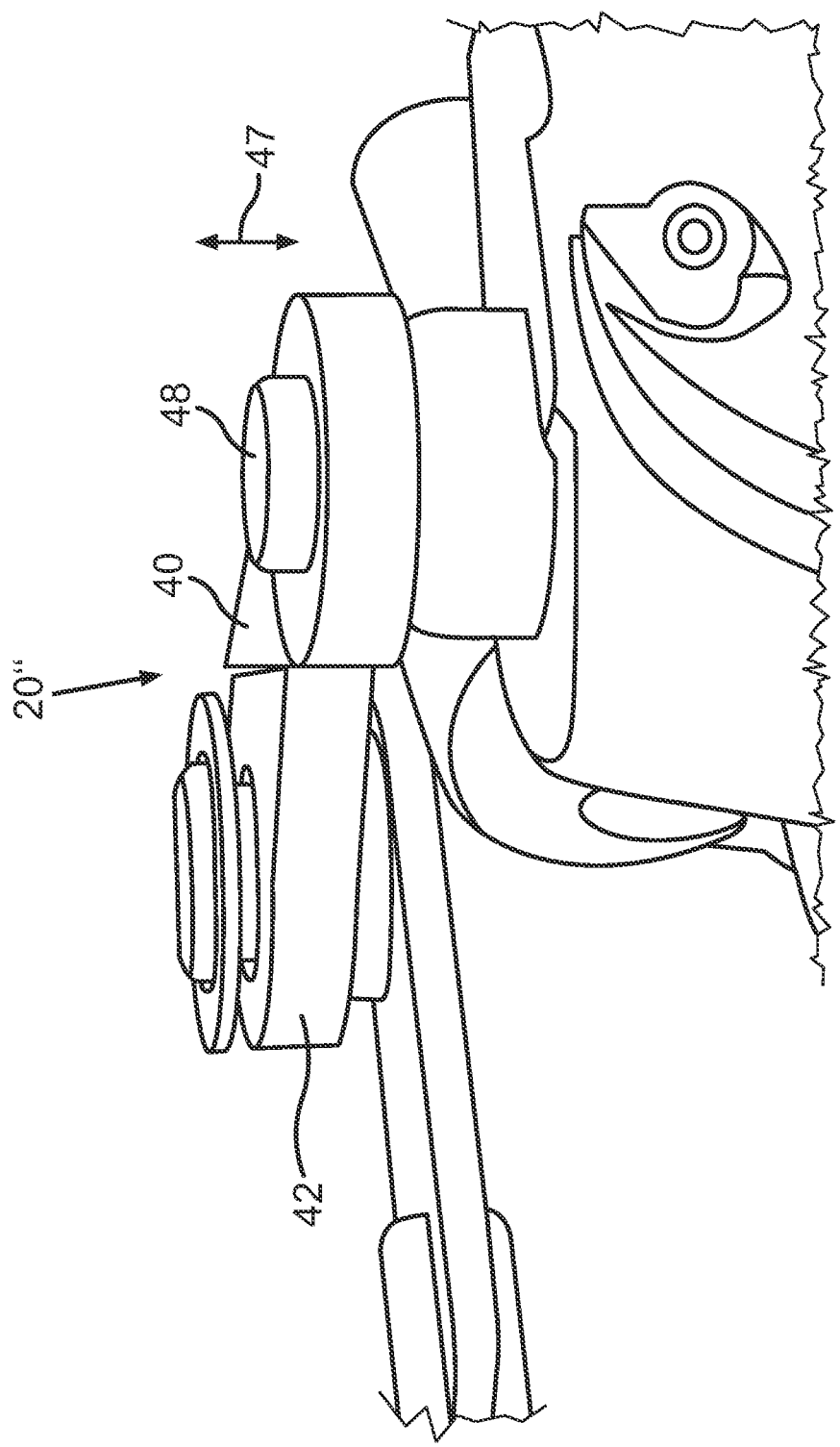
FIG. 10 is a perspective view of details of the actuator according to FIG. 9 in accordance with the invention.
Figure 11:
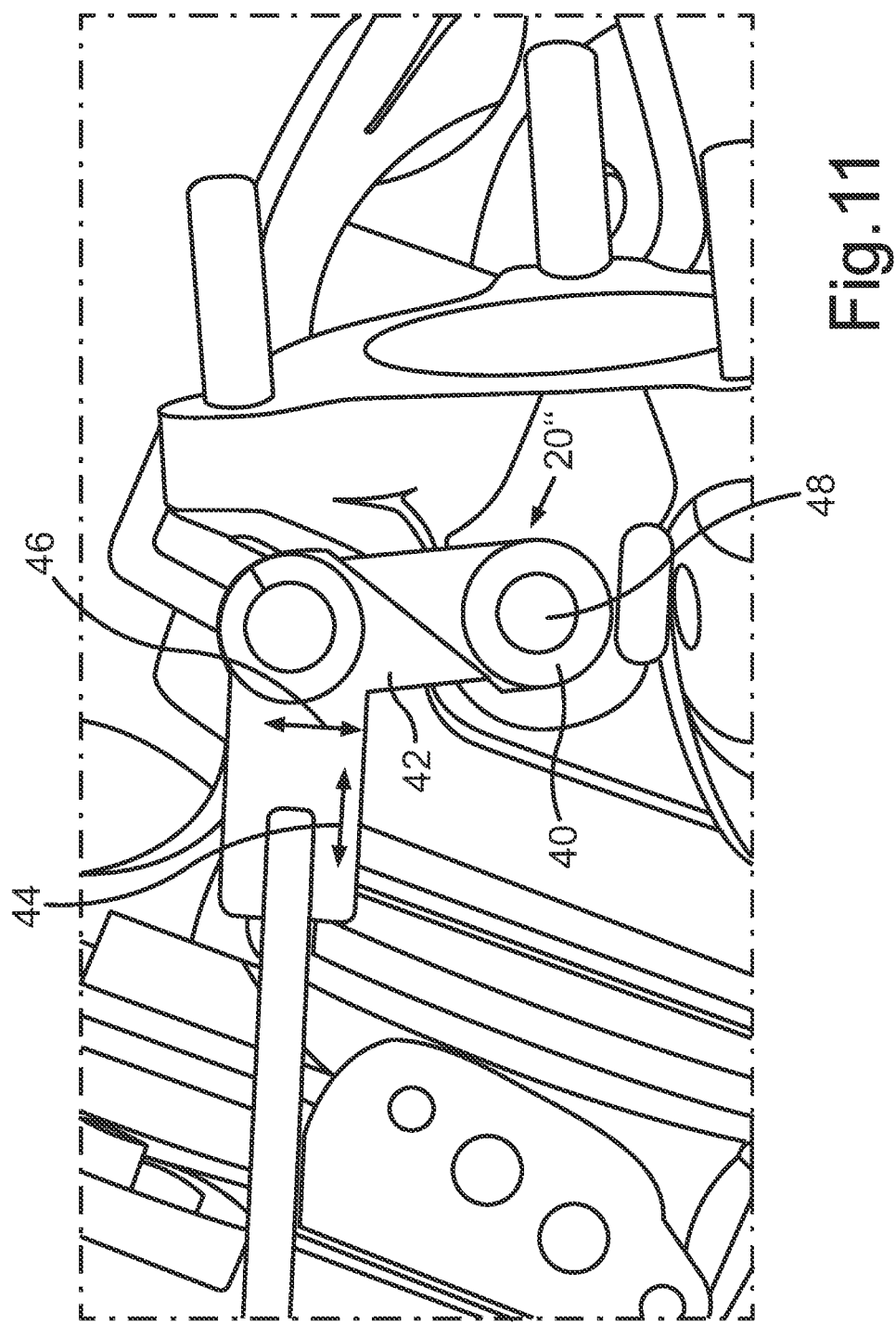
FIG. 11 is a further perspective view of details of the actuator according to FIG. 10 in accordance with the invention.

This alternative embodiment of the actuation section 20" becomes clear, in particular, in conjunction with FIGS. 10, 11 and 12.

The actuation section 20" is formed from two part actuation sections 40 and 42 which are in operative connection via faces which extend obliquely with respect to the direction of the longitudinal extent of the actuation section 20'. First of all, a tolerance compensation in the direction of the longitudinal extent of the actuation section 20" according to a direction arrow 46 and in a further translational direction perpendicularly with respect thereto according to a direction arrow 44 is made possible by way of these faces which extend obliquely with respect to the direction of the longitudinal extent of the actuation section 20". A third tolerance compensation in the third remaining translational direction according to a direction arrow 47 can be produced by a material thickness of the actuation section 20".

In addition, a rotational tolerance compensation is also made possible by the actuation section 20", which is clarified by FIG. 10. FIG. 10 shows a rotational offset of 2.2° between the part actuation section 40 and the part actuation section 42, which offset can be readily compensated for by the actuation section 20".

In order to connect the actuation section 20" to the valve element, a journal-shaped pivot pin 48 is provided which is welded, for example, to the actuation section 20".

LIST OF REFERENCE SYMBOLS

1 Housing
2 Exhaust gas turbocharger
3 Turbine side
4 Actuation section
5 Actuator
6 Actuating device
7 Compressor side
8 Actuating rod
9 Coupling element
10, 10', 10'', 10''', 10'''' Actuator
11 Arrow direction
12, 12' Housing
13 Fixing plate
14, 14' Actuating device
15 Arrow direction
16, 16', 16'', 16''', 16'''' Connecting device
17, 17', 17'', 17''' Tolerance compensation device
18, 18' Actuating rod
20, 20', 20'' Actuation section
22, 22', 22'', 22''' Pivot pin element
24, 24' Securing ring
26, 26', 26'' Coupling element
28 Recess
30 Wall
31 Direction arrow
32 Side
33 Wall
34 Wall
36 Direction arrow
38 Ball joint
40 Part actuation section
42 Part actuation section
44 Direction arrow
46 Direction arrow
47 Direction arrow
48 Journal-shaped pivot pin
100 Pivot pin
120 Concentricity guiding tool
140 Sliding guide
160 Welded joint
F Prestressing force

What is claimed is:

1. In combination with a charging device having at least one valve element, an actuator for the charging device, the actuator comprising at least one actuating device and a connecting device with a tolerance compensation device, wherein the at least one valve element is coupled via said connecting device to said at least one actuating device and is actuatable by said at least one actuating device, said tolerance compensation device including at least one coupling element which is connected via a push-in connection to at least one actuating rod of said tolerance compensation device, said push-in connection being configured substantially perpendicularly with respect to a circumferential face of said at least one coupling element, wherein said actuating rod has a groove on an end side thereof, wherein, in a preliminary state, said coupling element is adjustable in a direction of a longitudinal axis of said actuating rod and is also adjustable in a direction transverse with respect to the longitudinal axis of said actuating rod, and wherein, in a final state, said coupling element is immobilized in a fixed position with respect to said actuating rod.

2. The actuator according to claim 1, wherein the charging device is an exhaust gas turbocharger.

3. The actuator according to claim 2, wherein said actuating device is disposed on a compressor side of the exhaust gas turbocharger and said valve element is a bypass valve disposed on a turbine side of the exhaust gas turbocharger.

4. The actuator according to claim 1, wherein the at least one valve element is a wastegate.

5. The actuator according to claim 1, wherein said push-in connection includes a recess, in which said coupling element is received at least in regions thereof, and said recess is formed in said actuating rod from a side of said actuating rod, which side faces said coupling element.

6. The actuator according to claim 5, wherein a wall of said recess is spaced apart from said coupling element, which wall faces said coupling element in a direction of a longitudinal extent of said actuating rod.

7. The actuator according to claim 1, wherein said push-in connection includes a recess, in which said actuating rod is received at least in regions thereof.

8. The actuator according to claim 1, wherein said push-in connection includes a recess formed in said coupling element from a side of said coupling element, which side faces said actuating rod.

9. The actuator according to claim 1, wherein said push-in connection includes a recess and wherein a wall of said recess is spaced apart from said actuating rod, which wall faces said coupling element in a direction of a longitudinal extent of said actuating rod.

10. The actuator according to claim 1, wherein said push-in connection includes a recess and wherein said recess is formed by three walls and has three open sides.

11. The actuator according to claim 1, wherein said tolerance compensation device includes at least one ball joint.

12. The actuator according to claim 1, wherein said tolerance compensation device includes at least one actuation section, through which a substantially linear movement of said actuating rod is converted into a rotational movement of the valve element.

13. The actuator according to claim 12, wherein said actuation section is formed from two part actuation sections which are in operative connection via faces which extend obliquely with respect to a direction of a longitudinal extent of said actuation section.

14. The actuator according to claim 1, wherein said tolerance compensation device includes at least one displaceably mounted pivot pin element.

15. The actuator according to claim 14, wherein said pivot pin element is a journal-shaped pivot pin element.

16. The actuator according to claim 15, wherein said tolerance compensation device includes an actuation section, through which a substantially linear movement of said actuating rod can be converted into a rotational movement of the valve element, and wherein said journal-shaped pivot pin element is connected via in each case a welded joint to said coupling element and/or to said actuation section.

17. The actuator according to claim 14, wherein said pivot pin element is mounted such that it can be displaced substantially perpendicularly with respect to a base area of said coupling element.

18. The actuator according to claim 1, wherein said tolerance compensation device includes at least one journal-shaped pivot pin element which is connected via a push-in connection to said coupling element and/or to an actuation section of said tolerance compensation device.

19. The actuator according to claim 18, wherein said push-in connection of said journal-shaped pivot pin element is configured substantially perpendicularly with respect to a base area of said coupling element.

20. The actuator according to claim 1, wherein said actuating rod is connected via a welded joint to said coupling element.

21. The actuator according to claim 1, wherein said actuating device includes an electric actuating device.

\* \* \* \* \*